(12) United States Patent
Kim et al.

(10) Patent No.: US 8,328,379 B2
(45) Date of Patent: Dec. 11, 2012

(54) BACKLIGHT UNIT AND LIQUID CRYSTAL DISPLAY DEVICE INCLUDING THE SAME

(75) Inventors: Jong-Hyeok Kim, Gyeongsangbuk-do (KR); Kee Tae Yoo, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 151 days.

(21) Appl. No.: 12/318,279

(22) Filed: Dec. 23, 2008

(65) Prior Publication Data
US 2010/0008071 A1  Jan. 14, 2010

(30) Foreign Application Priority Data
Jul. 9, 2008 (KR) .................. 10-2008-0066480

(51) Int. Cl.
*G09F 13/04* (2006.01)
*G09F 13/08* (2006.01)
(52) U.S. Cl. ...................... 362/97.3; 362/97.2
(58) Field of Classification Search ............... 362/97.1, 362/97.2, 97.3, 612, 227, 230, 231, 599, 362/561
See application file for complete search history.

(56) References Cited

U.S. PATENT DOCUMENTS

| | | | |
|---|---|---|---|
| 7,002,546 B1 * | 2/2006 | Stuppi et al. | 345/102 |
| 7,651,235 B2 * | 1/2010 | Seki | 362/97.3 |
| 7,736,017 B2 * | 6/2010 | Huang et al. | 362/231 |
| 2005/0135094 A1 * | 6/2005 | Lee et al. | 362/231 |
| 2007/0274093 A1 | 11/2007 | Haim et al. | |
| 2008/0007509 A1 | 1/2008 | Lankhorst et al. | |
| 2008/0117356 A1 | 5/2008 | Oku et al. | |
| 2009/0015758 A1 * | 1/2009 | Pei et al. | 349/69 |
| 2009/0147501 A1 * | 6/2009 | Chang et al. | 362/97.3 |
| 2009/0168406 A1 * | 7/2009 | Kawasaki et al. | 362/97.3 |
| 2009/0284682 A1 * | 11/2009 | Lee et al. | 349/62 |

FOREIGN PATENT DOCUMENTS

| | | |
|---|---|---|
| CN | 101057175 | 10/2007 |
| EP | 1811332 A1 | 7/2007 |
| JP | 2003-133708 | 5/2003 |
| JP | 2006-324134 | 11/2006 |
| WO | 2007125623 A1 | 11/2007 |
| WO | 2009048709 A1 | 4/2009 |

OTHER PUBLICATIONS

Extended European Search Report issued Sep. 15, 2009 in corresponding European Application No. 08021102.2.

* cited by examiner

*Primary Examiner* — David Crowe
(74) *Attorney, Agent, or Firm* — Morgan, Lewis & Brockius LLP

(57) ABSTRACT

A backlight for a liquid crystal display device includes a first plurality of light emitting diodes having a first luminance and a second plurality of light emitting diodes having a second luminance, wherein at least the first and second plurality of light emitting diodes are interspersed with each other to provide an average luminance at or substantially near a predetermined target value of luminance that is consistent across the liquid crystal display device.

14 Claims, 4 Drawing Sheets

BACKLIGHT UNIT AND LIQUID CRYSTAL DISPLAY DEVICE INCLUDING THE SAME

This application claims the benefit of Korean Patent Application No. 10-2008-0066480, filed on Jul. 9, 2008, which is hereby incorporated by reference in its entirety.

BACKGROUND OF THE INVENTION

1. Field of the Invention

The embodiments of the invention relate to a liquid crystal display device, and more particularly, to a light emitting diode (LED) backlight unit and a liquid crystal display device including the backlight unit.

2. Discussion of the Related Art

In general, a notebook personal computer (NTPC) includes a liquid crystal display (LCD) device for displaying information. An LCD device includes a liquid crystal display panel, a backlight unit and a driving circuit unit. The liquid crystal display panel includes a plurality of liquid crystal cells disposed in matrix and a plurality of thin film transistors (TFTs) through which image signals are supplied. Rotation angles of liquid crystal molecules in each liquid crystal cell as well as transmittance through each liquid crystal cell are controlled according to the image signals so as to display images on the liquid crystal display panel. The backlight unit is disposed under and supplies light to the liquid crystal panel. A cold cathode fluorescent lamp (CCFL) is used as a light source for the backlight unit of an LCD device. The backlight unit should be designed to have a thin profile and light weight but yet provide a large amount of light to the liquid crystal display panel. Light emitting diodes (LEDs) have been suggested for use in a backlight unit because LEDs have the characteristics of low power consumption, light weight and high brightness compared to a CCFL.

FIG. 1 is a view showing an edge type backlight unit according to the related art. In FIG. 1, an LED backlight unit includes an LED array 10 having a flexible printed circuit (FPC) 12 and a plurality of LEDs 11 on the FPC 12 and an LED driving unit 20. The LED driving unit 20 controls the plurality of LEDs 11 being turned ON/OFF using an LED driving source power and an LED control signal from an external circuit unit (not shown).

The LED backlight unit may be classified according to luminance and color rank of chromaticity coordinates for application to an LCD device. The luminance may be represented by luminance intensity or luminance flux, and chromaticity coordinates may be represented by CIE (Commission International De L'eclairage) 1931 (x-y coordinates) or CIE 1976 (u'-v' coordinates). Ideally, the plurality of LEDs for a single LCD device should have the same luminance and the same color rank in chromaticity coordinates as one another.

In actuality, different LEDs, especially amongst different batches of LEDs, can have different luminances and different color rank in chromaticity coordinates from one another. Improper luminance and/or improper color rank of chromaticity coordinates in the backlight unit can cause improper color representation in the LCD device. Further, diversity in the average luminance and average color rank of chromaticity coordinates for different backlight units can cause a non-uniform color representations amongst the different LCD devices made with the different backlight units.

SUMMARY OF THE INVENTION

Accordingly, embodiments of the invention are directed to a backlight unit and a liquid crystal display device including the backlight unit that substantially obviate one or more of the problems due to limitations and disadvantages of the related art.

An object of embodiments of the invention is to provide a backlight unit that supplies light of various luminances and various color ranks in chromaticity coordinates such that an average luminance and an average color rank of chromaticity coordinates are at or substantially near predetermined target values.

Another object of embodiments of the invention is to provide liquid crystal display devices having uniform color representations.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a backlight for a liquid crystal display device includes a first plurality of light emitting diodes having a first luminance and a second plurality of light emitting diodes having a second luminance, wherein at least the first and second plurality of light emitting diodes are interspersed with each other to provide an average luminance at or substantially near a predetermined target value of luminance that is consistent across the liquid crystal display device.

In another aspect, a backlight for a liquid crystal display device includes a first plurality of light emitting diodes having a first color rank in chromaticity coordinates and a second plurality of light emitting diodes having a second color rank in chromaticity coordinates, wherein at least the first and second plurality of light emitting diodes are combined with each other to provide an average color rank in chromaticity coordinates at or substantially near a predetermined target value of color rank in chromaticity coordinates.

In yet another aspect, a backlight for a liquid crystal display device includes a first plurality of light emitting diodes having a first luminance and a first color rank in chromaticity coordinates; a second plurality of light emitting diodes having a second luminance and a second color rank in chromaticity coordinates; a third plurality of light emitting diodes having a third luminance and a third color rank in chromaticity coordinates; and a fourth plurality of light emitting diodes having a fourth luminance and a fourth color rank in chromaticity coordinates, wherein at least the first and second plurality of light emitting diodes are interspersed with each other to provide an average luminance at or substantially near a predetermined target value of luminance, and wherein at least the third and fourth plurality of light emitting diodes are combined with each other to provide an average color rank in chromaticity coordinates at or substantially near a predetermined target value of color rank in chromaticity coordinates.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to embodiments which are illustrated in the accompanying drawings. Wherever possible, similar reference numbers will be used to refer to the same or similar parts.

In a liquid crystal display (LCD) device according to an embodiment of the invention, a plurality of light emitting diodes (LEDs) of a backlight unit can have various luminances and various color ranks in chromaticity coordinates that are combined such that an average luminance and an average color ranks in chromaticity coordinates of the plurality of LEDs or substantially near predetermined target values for both luminance and color ranks in chromaticity coordinates. Accordingly, diversity in either or both luminance and color rank in chromaticity coordinates of the backlight unit does not degrade color representation in an LCD device or series of LCD devices such that high image quality is maintained.

Backlight units for an LCD device according to embodiments of the invention may be classified into three types: a first type in which the plurality of LEDs have the same color rank of chromaticity coordinates as one another and have at least two different luminances; a second type in which the plurality of LEDs have the same luminance as one another and have at least two different color ranks in chromaticity coordinates; and a third type in which the plurality of LEDs have at least two different color ranks in chromaticity coordinates and at least two different luminances.

A backlight unit for an LCD device according to embodiments of the invention may include a plurality of LEDs such that at least two of the plurality of LEDs has at least one of different luminances and different color ranks in chromaticity coordinates. For example, when first and second LEDs have the different luminances and a same color ranks in chromaticity coordinates, third and fourth LEDs have a same luminances and the different color ranks in chromaticity coordinates, and fifth and sixth LEDs have the different luminances and the different color ranks in chromaticity coordinates, the backlight unit may include at least one pair of first to sixth LEDs. As a result, the backlight unit according to embodiments of the invention may have one of a first combination including the first and second LEDs, a second combination including the third and fourth LEDs, a third combination including the fifth and sixth LEDs, a fourth combination including the first, second, third and fourth LEDs, a fifth combination including the first, second, fifth and sixth LEDs, a sixth combination including the third, fourth, fifth and sixth LEDs, and a seventh combination including the first, second, third, fourth, fifth and sixth LEDs.

Figure 1:
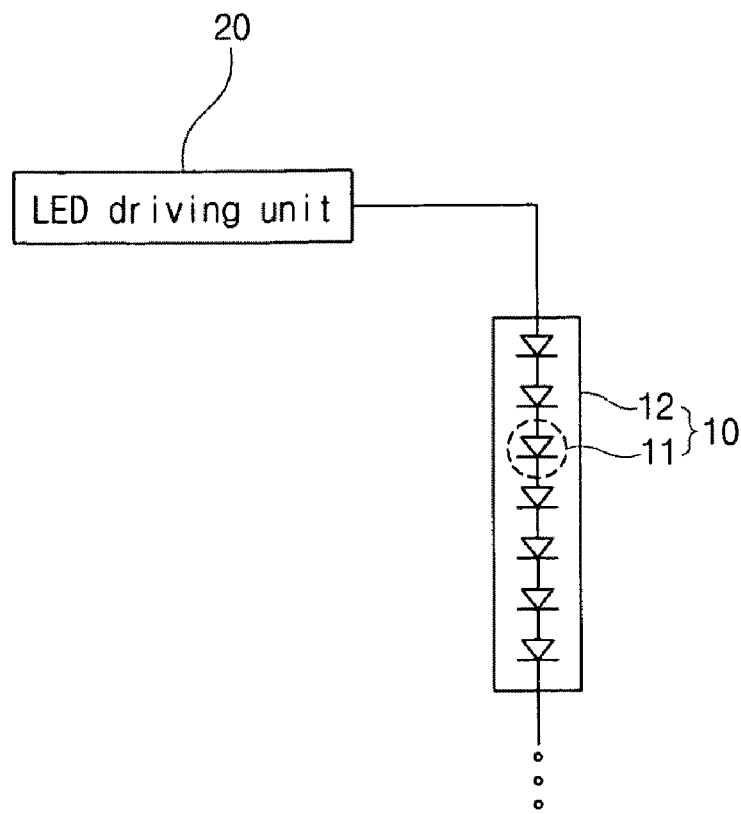
FIG. 1 is a view showing an edge type backlight unit according to the related art.
Figure 2:
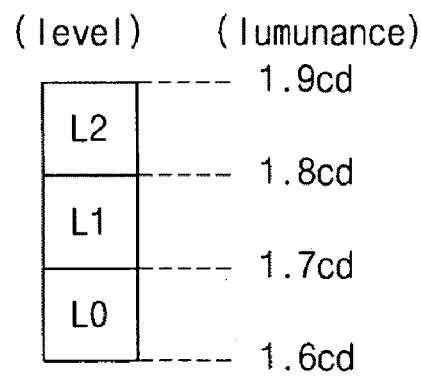
FIG. 2 is a view illustrating luminances of LEDs for a backlight unit according to an embodiment of the invention.

FIG. 2 is a view illustrating luminances of an LED for a backlight unit according to an embodiment of the invention. As shown in FIG. 2, LEDs having the same color rank in chromaticity coordinates has one of zeroth, first and second levels L0, L1 and L2 corresponding different luminances. For example, the LED of the zeroth level L0 may have a luminance within a range of about 1.6 cd (candela) to about 1.7 cd. In addition, the LED of the first level L1 may have a luminance within a range of about 1.7 cd to about 1.8 cd, and the LED of the second level L2 may have a luminance within a range of about 1.8 cd to about 1.9 cd. When an LED of the zeroth level L0 and an LED of the second level L2 are used together, light having luminance corresponding to the first level L1 is emitted. (L0+L2≈L1) Accordingly, a plurality of LEDs having different luminances and the same color rank in chromaticity coordinates are interspersed with each other such that the backlight unit supplies light of average luminance at or substantially near a predetermined target value of luminance. For example, the LEDs having different luminances can be interleaved with one another. In addition, the plurality of LEDs may have various combinations of LEDs having different luminances in which each combination generates an average luminance at or substantially near a predetermined target value of luminance that is consistent across the LCD device. As a result, the backlight unit supplying light of a predetermined luminance may include the plurality of LEDs having the same color rank in chromaticity coordinates and having at least two different luminances.

Figures 3, 4:
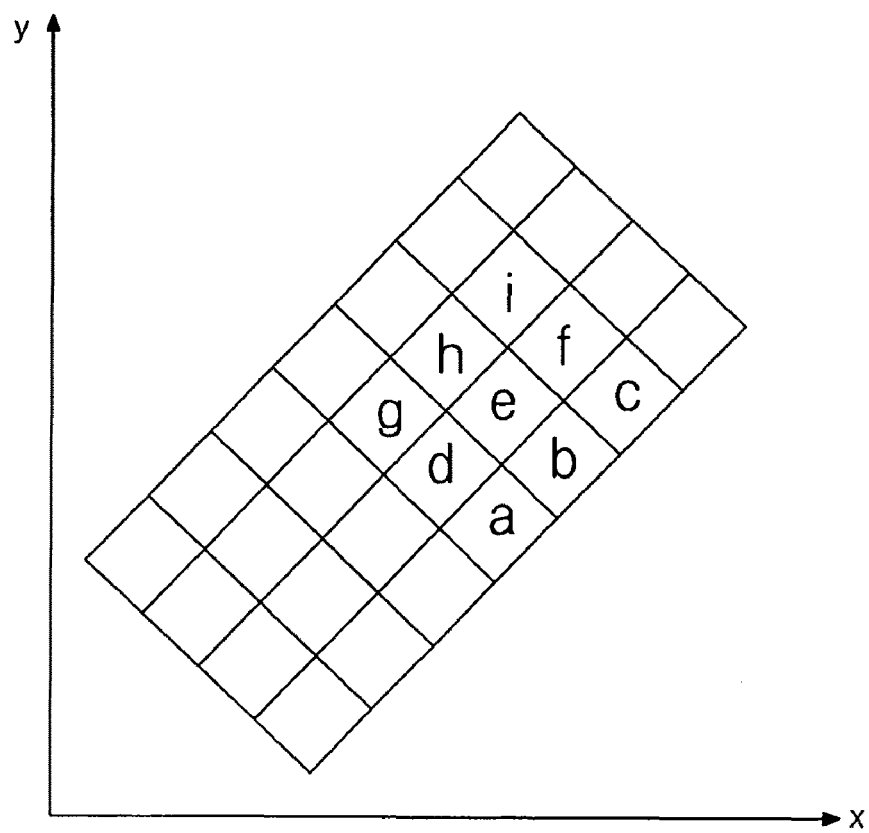
FIG. 3 is a view illustrating a color rank in chromaticity coordinates of LEDs for a backlight unit according to an embodiment of the invention.
FIG. 4 is a view showing luminances of LEDs of a backlight unit of TABLE 1.

FIG. 3 is a view illustrating a color rank in chromaticity coordinates of LEDs for a backlight unit according to an embodiment of the invention. Although FIG. 3 shows x-y coordinates of CIE 1931, u'-v' coordinates of CIE 1976 may be used in another embodiment. As shown in FIG. 3, LEDs having the same luminance has one of different color ranks "a" to "i" in chromaticity coordinates. When LEDs of different color ranks are used together, light having the average color rank is emitted. For example, an LED having the color rank "i" and an LED having the color rank "a" are respectively grouped together for a backlight unit, the backlight unit may supply light having the color rank "e" corresponding to the average color rank. (i+a≈e). In addition, when LEDs having the color ranks "f," "h" and "a" are used together for a backlight unit, the backlight unit may supply light having the color rank "e" corresponding to the average color rank. (f+h+a≈e) Accordingly, a plurality of LEDs has the same luminance and different color ranks in chromaticity coordinates are used for a backlight unit such that the backlight unit supplies light of the average color rank in chromaticity coordinates at or substantially near a predetermined target value of color rank in chromaticity coordinates. In addition, the plurality of LEDs may have various combinations having the same average color rank in chromaticity coordinates at or substantially near a predetermined target value of color rank in chromaticity coordinates. As a result, the backlight unit supplying light of an average color rank in chromaticity coordinates at or substantially near a predetermined target value of color rank in chromaticity coordinates may include a plurality of LEDs having at least two color ranks in chromaticity coordinates and the same luminance.

Alternatively, a plurality of LEDs having different luminances and different color ranks in chromaticity coordinates are used for a backlight unit such that the backlight unit supplies light of average luminance at or substantially near a predetermined target value of luminance and an average color rank in chromaticity coordinates at or substantially near a predetermined target value of color rank in chromaticity coordinates. Further, the plurality of LEDs may have various combinations of luminances that each provide an average luminance at or substantially near a predetermined target value of luminance and various combinations color rank in chromaticity coordinates that each provide an average color rank in chromaticity coordinates at or substantially near a predetermined target value of chromaticity coordinates. Such combinations can include LEDs having the same luminance as the predetermined target value of luminance or having the same color rank in chromaticity coordinates as the predetermined target color rank in chromaticity coordinates. As a result, the backlight unit supplying light of a predetermined target luminance and a predetermined target color rank in chromaticity coordinates may include a plurality of LEDs having at least two different luminances and at least two different color ranks in chromaticity coordinates.

Therefore, the backlight unit including the plurality of LEDs according to an embodiment of the invention can have diversity in either both or one of luminance and color rank of chromaticity coordinates. A backlight unit including a plurality of LEDs has a predetermined luminance and a predetermined color rank in chromaticity coordinates by one of a first combination where the plurality of LEDs have the same luminance and the same color rank, a second combination where the plurality of LEDs have the same luminance and at least two different color rank in chromaticity coordinates, a third combination where the plurality of LEDs have the same color rank in chromaticity coordinates and at least two different luminances, and a fourth combination where the plurality of LEDs have at least two different luminances and at least two different color ranks in chromaticity coordinates. For example, when the backlight unit has the luminance of the first level L1 and the color rank "e" in chromaticity coordinates, 1) the plurality of LEDs may have the luminance of the first level L1 and the color rank "e" (L1-*e*, L1-*e*, L1-*e*, ...), 2) the plurality of LEDs may have the luminance of first level L1 and two color ranks "i" and "a" (L1-*i*, L1-*a*, L1-*i*, L1-*a*, ...), 3) the plurality of LEDs may have two luminances of zeroth and second levels L0 and L2 and two color ranks "i" and "a" (L2-*i*, L0-*a*, L2-*i*, L0-*a*, ...), or 4) the plurality of LEDs may have three luminances of zeroth, first and second levels L0, L1 and L2 and three color ranks "f," "h" and "a" (L0-*f*, L1-*h*, L2-*a*, L0-*f*, L1-*h*, L2-*a*, ...).

Figure 5:
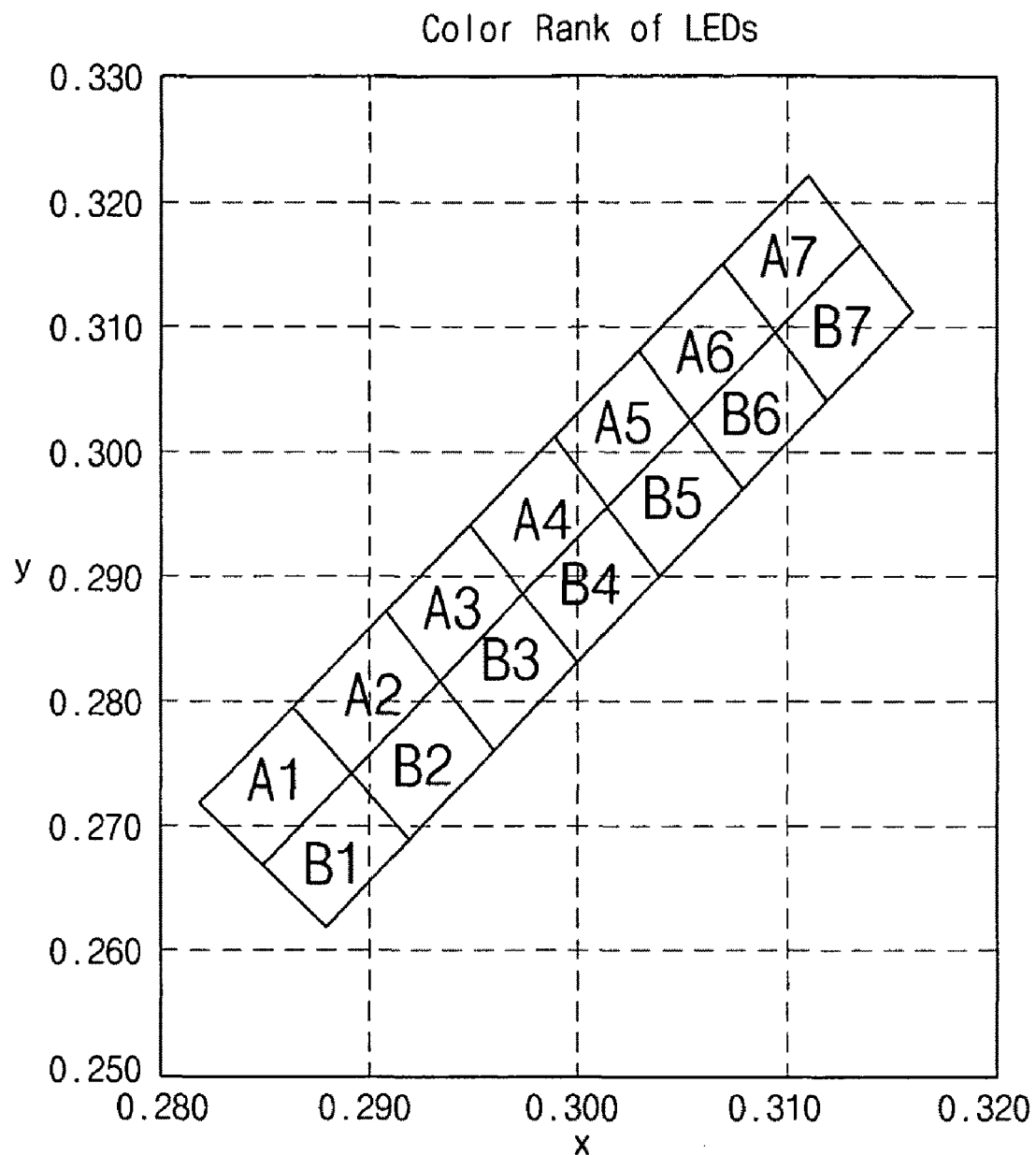
FIG. 5 is a view showing color ranks of LEDs of a backlight unit of TABLE 1.
Figure 6:
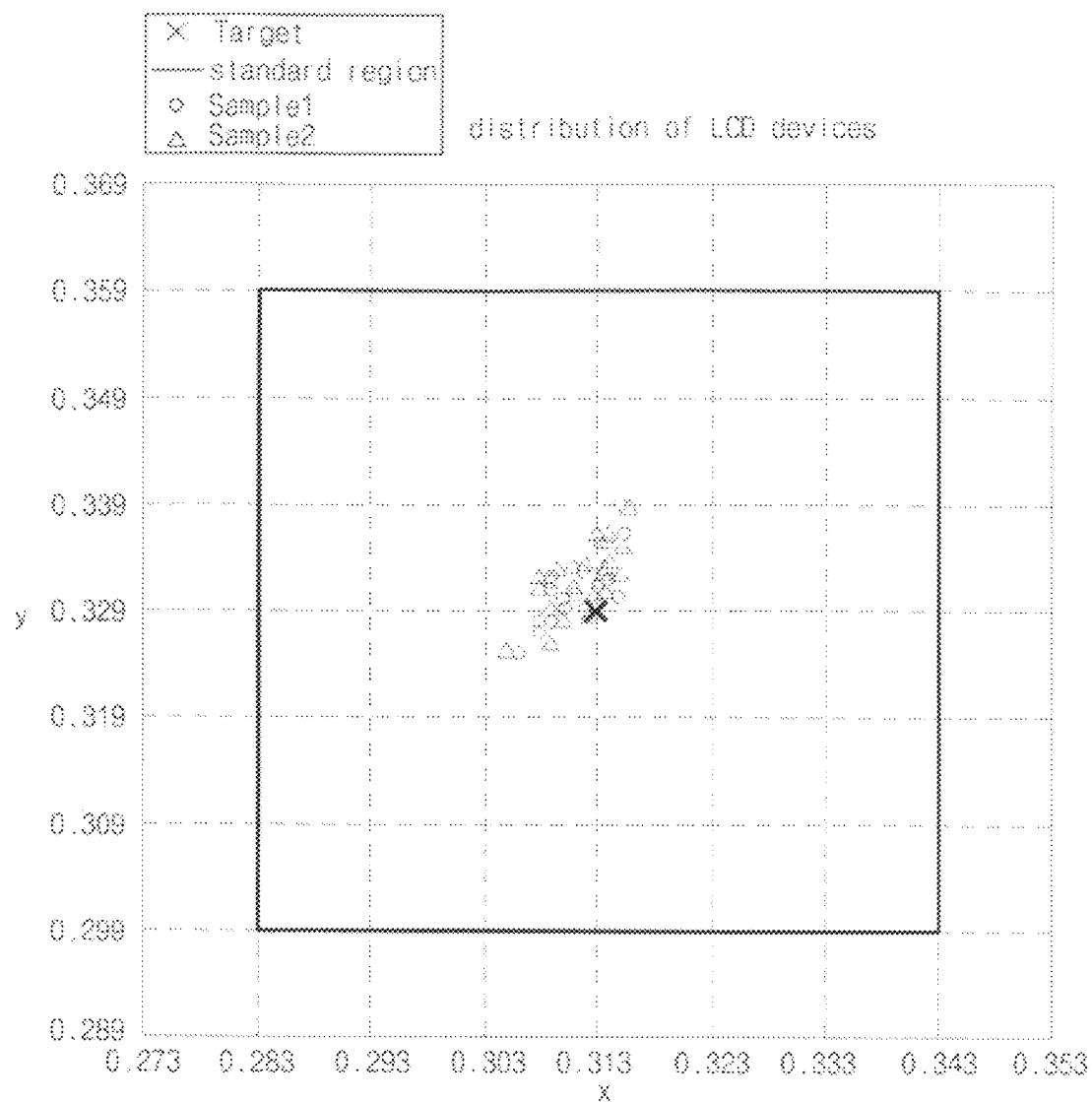
FIG. 6 is a view showing a distribution of LCD devices each including a backlight unit of TABLE 1.

TABLE 1 is a table showing experiment data of a plurality of LEDs and a backlight unit including the plurality of LEDs for an LCD device according to an embodiment of the invention. FIG. 4 is a view showing luminances of LEDs of a backlight unit of TABLE 1, FIG. 5 is a view showing color ranks of LEDs of a backlight unit of TABLE 1. In addition, FIG. 6 is a view showing a distribution of LCD devices each including a backlight unit of TABLE 1.

In TABLE 1 and FIGS. 4 and 5, a backlight unit may include a plurality of first LEDs LED1 and a plurality of second LEDs LED2. Each of the first and second LEDs LED1 and LED2 may have a luminance of one of first to fourth levels L1 to L4 and a color rank in chromaticity coordinates of one of first to seventh A regions A1 to A7 and first to seventh B regions B1 to B7. The plurality of first and second LEDs LED1 and LED2 of the backlight unit have twenty different combinations. Further, each combination of the plurality of first and second LEDs LED1 and LED2 is applied to the backlight units of two LCD devices Sample 1 and Sample 2, as indicated in Table I.

TABLE 1

| No. | Combination of LEDs | | | | Sample 1 | | | Sample 2 | | |
| | luminance level | | color rank | | | | | | | |
| | LED1 | LED2 | LED1 | LED2 | cd/m² | x | y | cd/m² | x | y |
| --- | --- | --- | --- | --- | --- | --- | --- | --- | --- | --- |
| 1 | 8 | 6 | A7 | B4 | 236 | 0.309 | 0.331 | 249 | 0.313 | 0.336 |
| 2 | 7 | 8 | A4 | B7 | 238 | 0.312 | 0.329 | 256 | 0.314 | 0.336 |
| 3 | 7 | 7 | A5 | B6 | 261 | 0.315 | 0.339 | 252 | 0.314 | 0.333 |
| 4 | 8 | 6 | A6 | A4 | 253 | 0.315 | 0.330 | 241 | 0.309 | 0.333 |
| 5 | 7 | 8 | A5 | B5 | 252 | 0.313 | 0.335 | 244 | 0.313 | 0.330 |
| 6 | 7 | 7 | B5 | B5 | 249 | 0.313 | 0.331 | 246 | 0.314 | 0.333 |
| 7 | 7 | 7 | A6 | B5 | 248 | 0.312 | 0.333 | 238 | 0.314 | 0.331 |
| 8 | 7 | 8 | B4 | B6 | 248 | 0.309 | 0.332 | 248 | 0.315 | 0.332 |
| 9 | 9 | 6 | A7 | B5 | 223 | 0.314 | 0.332 | 251 | 0.316 | 0.339 |
| 10 | 6 | 7 | A3 | B7 | 246 | 0.315 | 0.336 | 234 | 0.312 | 0.329 |
| 11 | 7 | 6 | A7 | B3 | 243 | 0.314 | 0.335 | 247 | 0.312 | 0.333 |
| 12 | 7 | 7 | B4 | B5 | 240 | 0.311 | 0.331 | 246 | 0.315 | 0.335 |
| 13 | 6 | 6 | B4 | B5 | 225 | 0.310 | 0.329 | 233 | 0.314 | 0.333 |
| 14 | 6 | 7 | A1 | B7 | 266 | 0.310 | 0.330 | 269 | 0.311 | 0.331 |
| 15 | 7 | 8 | B2 | A7 | 275 | 0.311 | 0.333 | 274 | 0.308 | 0.331 |
| 16 | 7 | 8 | B1 | B6 | 276 | 0.308 | 0.327 | 277 | 0.309 | 0.326 |
| 17 | 7 | 8 | B1 | A7 | 274 | 0.309 | 0.328 | 275 | 0.309 | 0.329 |
| 18 | 6 | 7 | A2 | A7 | 268 | 0.309 | 0.332 | 268 | 0.308 | 0.332 |
| 19 | 6 | 7 | B1 | B7 | 266 | 0.308 | 0.328 | 267 | 0.310 | 0.328 |
| 20 | 6 | 7 | A1 | B6 | 259 | 0.306 | 0.325 | 260 | 0.305 | 0.325 |

As shown in FIG. 4, the first, second, third and fourth levels L1, L2, L3 and L4 correspond to ranges of about 1.6 cd to about 1.7 cd, about 1.7 cd to about 1.8 cd, about 1.8 cd to about 1.9 cd and about 1.9 cd to about 2.0 cd, respectively. The first LEDs LED1 and the second LEDs LED2 can be at different levels or at the same level. Each of the combinations of the first LEDs LED1 and the second LEDs LED2 provide an average luminance substantially near a predetermined target value of luminance, such as within 0.1 cd of the target value of luminance, or at the target valued of luminance.

As shown in FIG. 5, the first to fourteenth color ranks A1-A7 and B1-B7 correspond to color rank in chromaticity coordinates having an x value and y value. The first LEDs LED1 and the second LEDs LED2 can have different color ranks in chromaticity coordinates or the same color rank in chromaticity coordinates. Each of the combinations of the first LEDs LED1 and the second LEDs LED2 provide combinations of color rank in chromaticity coordinates that each provide an average color rank in chromaticity coordinates substantially near a predetermined target value of chromaticity coordinates, such as within 0.01 of a chromaticity coordinate, or at the predetermined target value of chromaticity coordinates.

As shown in FIG. 6, an LCD device including a backlight unit has a predetermined color rank X, i.e., a target color rank, corresponding to a position having an x value of about 0.313 and a y value of about 0.329 in chromaticity coordinates. (x=0.313, y=0.329) The color ranks of the LCD devices of Samples 1 and 2 including the backlight units of various combinations of the plurality of first and second LEDs are distributed in a standard region substantially near the predetermine color rank such that the LCD device has acceptable color property. Because the color ranks of the LCD devices are substantially near the predetermined color rank X, the uniformity in color representation of the LCD devices is improved.

Consequently, a backlight unit according to embodiments of the invention may supply light having uniform luminance using various combinations of a plurality of LEDs having different luminances and different color ranks. Further, LCD devices including the backlight unit according to the invention have improved uniformity in color representation using a combination of a plurality of LEDs having different luminances and different color ranks.

It will be apparent to those skilled in the art that various modifications and variations can be made in a backlight unit and a liquid crystal display device including the backlight unit shown in the above embodiments of the invention without departing from the spirit or scope of the invention. Thus, it is intended that the invention cover the modifications and variations of this invention provided they come within the scope of the appended claims and their equivalents.

What is claimed is:

1. A backlight for a liquid crystal display device, comprising:
    a first plurality of light emitting diodes each having a first luminance and a first color rank in chromaticity coordinates;
    a second plurality of light emitting diodes each having a second luminance different from the first luminance and a second color rank in chromaticity coordinates different from the first rank in chromaticity coordinates,
    wherein at least the first and second plurality of light emitting diodes are interspersed with each other to provide an average luminance of the first and second luminances at a target value of luminance that is consistent across the liquid crystal display device, and
    wherein the first and second plurality of light emitting diodes are respectively grouped together to provide an average color rank of the first and second color ranks in chromaticity coordinates at a single target value of color rank in chromaticity coordinates; and
    a third plurality of light emitting diodes having a third luminance equal to the average luminance at the target value.

2. The backlight for a liquid crystal display device according to claim 1, wherein the first and second plurality of light emitting diodes are interleaved.

3. The backlight for a liquid crystal display device according to claim 1, further including a fourth plurality of light emitting diodes having the third luminance equal to the average luminance, wherein the third and fourth plurality of light emitting diodes have different color ranks in chromaticity coordinates and are respectively grouped together to provide an average color rank in chromaticity coordinates at the single target value of color rank in chromaticity coordinates.

4. A backlight for a liquid crystal display device, comprising:
    a first plurality of light emitting diodes each having a first luminance and a first color rank in chromaticity coordinates;
    a second plurality of light emitting diodes each having a second luminance different from the first luminance and a second color rank in chromaticity coordinates different from the first color rank in chromaticity coordinates,
    wherein at least the first and second plurality of light emitting diodes are interposed with each other to provide an average luminance of the first and second luminances at a target value of luminance that is consistent across the liquid crystal display device, and
    wherein at least the first and second plurality of light emitting diodes are combined with each other to provide an average color rank of the first and second color ranks in chromaticity coordinates at a single target value of color rank in chromaticity coordinates; and
    a third plurality of light emitting diodes having a third luminance equal to the average luminance at the target value.

5. The backlight for a liquid crystal display device according to claim 4, wherein the third plurality of light emitting diodes have a third color rank in chromaticity coordinates equal to the average color rank in chromaticity coordinates.

6. The backlight for a liquid crystal display device according to claim 5, further including a fourth plurality of light emitting diodes having the third color rank in chromaticity coordinates equal to the average color rank in chromaticity coordinates.

7. A backlight for a liquid crystal display device, comprising:
    a first plurality of light emitting diodes each having a first luminance and a first color rank in chromaticity coordinates;
    a second plurality of light emitting diodes each having a second luminance different from the first luminance and a second color rank in chromaticity coordinates a same as the first color rank in chromaticity coordinates;
    a third plurality of light emitting diodes each having a third luminance and a third color rank in chromaticity coordinates;
    a fourth plurality of light emitting diodes each having a fourth luminance a same as the third luminance and a fourth color rank in chromaticity coordinates different from the third color rank in chromaticity coordinates,
    wherein at least the first and second plurality of light emitting diodes are interspersed with each other to provide an average luminance of the first to fourth luminances at a target value of luminance, and
    wherein at least the third and fourth plurality of light emitting diodes are combined with each other to provide an average color rank of the first to fourth color ranks in chromaticity coordinates at a single target value of color rank in chromaticity coordinates; and
    a fifth plurality of light emitting diodes having a fifth luminance at the single target value of luminance.

8. The backlight for a liquid crystal display device according to claim 7, wherein each of the first and second color rank in chromaticity coordinates has the single target value of color rank in chromaticity coordinates, and wherein at least the third and fourth plurality of light emitting diodes provide an average color rank in chromaticity coordinates at the single target value of color rank in chromaticity coordinates.

9. The backlight for a liquid crystal display device according to claim 7, wherein each of the third and fourth luminances has the target value of luminance.

10. The backlight for a liquid crystal display device according to claim 7, wherein the fifth plurality of light emitting diodes having a fifth color rank at the single target value of color rank in chromaticity coordinates.

11. The backlight for a liquid crystal display device according to claim 7, wherein at least the third and fourth plurality of light emitting diodes are interspersed with each other to provide an average luminance at the target value of luminance, and wherein at least the first and second plurality of light emitting diodes are combined with each other to provide an average color rank in chromaticity coordinates at the single target value of color rank in chromaticity coordinates.

12. The backlight for a liquid crystal display device according to claim 7, further comprising:
   a sixth plurality of light emitting diodes each having a sixth luminance and a sixth color rank in chromaticity coordinates; and
   a seventh plurality of light emitting diodes each having a seventh luminance different from the sixth luminance and a seventh color rank in chromaticity coordinates different from the sixth color rank in chromaticity coordinates,
   wherein at least the sixth and seventh plurality of light emitting diodes are interspersed with each other to provide an average luminance of the first to seventh luminances at the target value of luminance and an average color rank of the first to seventh color ranks in chromaticity coordinates at the single target value of color rank in chromaticity coordinates.

13. A backlight for a liquid crystal display device, comprising:
   a first plurality of light emitting diodes each having a first luminance and a first color rank in chromaticity coordinates;
   a second plurality of light emitting diodes each having a second luminance different from the first luminance and a second color rank in chromaticity coordinates a same as the first color rank in chromaticity coordinates;
   a third plurality of light emitting diodes each having a third luminance different from each of the first and second luminances and a third color rank in chromaticity coordinates different from each of the first and second color ranks in chromaticity coordinates; and
   a fourth plurality of light emitting diodes each having a fourth luminance different from each of the first to third luminances and a fourth color rank in chromaticity coordinates different from each of the first to third color ranks in chromaticity coordinates,
   wherein the first to fourth plurality of light emitting diodes are interspersed with each other to provide an average luminance of the first to fourth luminances at a target value of luminance and an average color rank of the first to fourth color ranks in chromaticity coordinates at a single target value of color rank in chromaticity coordinates; and a fifth plurality of light emitting diodes having a fifth luminance at the target value of luminance.

14. A backlight for a liquid crystal display device, comprising:
   a first plurality of light emitting diodes each having a first luminance and a first color rank in chromaticity coordinates;
   a second plurality of light emitting diodes each having a second luminance a same as the first luminance and a second color rank in chromaticity coordinates different from the first color rank in chromaticity coordinates;
   a third plurality of light emitting diodes each having a third luminance different from each of the first and second luminances and a third color rank in chromaticity coordinates different from each of the first and second color ranks in chromaticity coordinates; and
   a fourth plurality of light emitting diodes each having a fourth luminance different from each of the first to third luminances and a fourth color rank in chromaticity coordinates different from each of the first to third color ranks in chromaticity coordinates,
   wherein the first to fourth plurality of light emitting diodes are interspersed with each other to provide an average luminance of the first to fourth luminances at a target value of luminance and an average color rank of the first to fourth color ranks in chromaticity coordinates at a single target value of color rank in chromaticity coordinates; and a fifth plurality of light emitting diodes having a fifth luminance at the target value of luminance.

* * * * *